(12) United States Patent
Linnewiel

(10) Patent No.: US 10,954,016 B2
(45) Date of Patent: Mar. 23, 2021

(54) ADHESIVE CLAMP FOR CLOSING A BAG

(71) Applicant: Ron Linnewiel, Yavne (IL)

(72) Inventor: Ron Linnewiel, Yavne (IL)

(73) Assignee: DI-EL TACK LTD., Yavne (IL)

( * ) Notice: Subject to any disclaimer, the term of this patent is extended or adjusted under 35 U.S.C. 154(b) by 767 days.

(21) Appl. No.: 14/870,071

(22) Filed: Sep. 30, 2015

(65) Prior Publication Data
US 2016/0059979 A1 Mar. 3, 2016

Related U.S. Application Data

(63) Continuation of application No. 13/382,158, filed as application No. PCT/IB2010/052625 on Jun. 13, 2010, now abandoned.

(60) Provisional application No. 61/223,426, filed on Jul. 7, 2009, provisional application No. 61/324,318, filed on Apr. 15, 2010.

(51) Int. Cl.
*B65B 51/06* (2006.01)
*C09J 7/20* (2018.01)
*C09J 7/24* (2018.01)
*C09J 7/25* (2018.01)

(52) U.S. Cl.
CPC ............... *B65B 51/06* (2013.01); *C09J 7/20* (2018.01); *C09J 7/243* (2018.01); *C09J 7/255* (2018.01); *C09J 2301/122* (2020.08); *C09J 2423/006* (2013.01); *C09J 2423/046* (2013.01); *C09J 2423/106* (2013.01); *C09J 2467/006* (2013.01); *Y10T 24/15* (2015.01); *Y10T 24/33* (2015.01)

(58) Field of Classification Search
CPC .. B65B 51/06; C09J 7/02; C09J 7/0275; C09J 7/0285; C09J 2201/122; C09J 2423/006; C09J 2423/046; C09J 2423/106; C09J 2467/006; Y10T 24/15
USPC .......................................................... 493/214
See application file for complete search history.

(56) References Cited

U.S. PATENT DOCUMENTS

| | | | | |
|---|---|---|---|---|
| 3,537,636 A | * | 11/1970 | Rochette | B65D 33/02 383/89 |
| 3,806,024 A | * | 4/1974 | Marchesani | B65D 33/1691 383/62 |
| 4,149,320 A | * | 4/1979 | Troyer | G01B 3/1002 33/758 |
| 4,285,104 A | * | 8/1981 | Corey | B42F 13/02 402/14 |
| 4,557,505 A | * | 12/1985 | Schaefer | B44F 1/00 206/807 |
| 4,562,102 A | * | 12/1985 | Rabuse | C09J 7/02 156/90 |
| 4,605,577 A | * | 8/1986 | Bowytz | C09J 7/02 156/313 |
| 4,902,141 A | * | 2/1990 | Linnewiel | B65D 33/1691 383/61.1 |
| 4,911,563 A | * | 3/1990 | Ciani | B65D 33/1691 206/813 |

(Continued)

*Primary Examiner* — Sameh Tawfik
(74) *Attorney, Agent, or Firm* — Alphapatent Associates, Ltd; Daniel J. Swirsky

(57) ABSTRACT

An adhesive clamp for reclosing a packaging bag, the adhesive clamp comprises a tape having one side of the tape coated with an adhesive substance and a clamping strip of foldable non-elastic material attached to the adhesive side of the tape and where the tape is wider and longer than the clamping strip.

11 Claims, 12 Drawing Sheets

(56) References Cited

U.S. PATENT DOCUMENTS

| | | | | |
|---|---|---|---|---|
| 5,044,776 A * | 9/1991 | Schramer | ............... | B65D 33/20 206/813 |
| 5,176,452 A * | 1/1993 | Stern | ...................... | B65D 33/30 24/30.5 P |
| 5,215,797 A * | 6/1993 | Larsen | ............... | B65D 33/1691 428/40.1 |
| 5,227,210 A * | 7/1993 | Larsen | .................. | B65C 9/1869 428/42.3 |
| 5,328,436 A * | 7/1994 | Larsen | ............... | B65D 33/1691 493/213 |
| 5,582,889 A * | 12/1996 | Pedrini | ..................... | G09F 3/02 383/62 |
| 5,772,331 A * | 6/1998 | Irace | .................. | B65D 33/1691 383/90 |
| 6,033,762 A * | 3/2000 | Decker | ............. | B65D 33/1616 428/201 |
| 6,037,042 A * | 3/2000 | Kato | .......................... | C09J 7/02 427/208 |
| 6,149,203 A * | 11/2000 | Hanlon | ................. | G09F 3/0292 283/101 |
| 6,224,975 B1 * | 5/2001 | Wang | ..................... | C09J 7/0246 428/192 |
| 6,299,355 B1 * | 10/2001 | Schneck | ................ | B65D 75/58 383/203 |
| 6,517,243 B2 * | 2/2003 | Huffer | .................... | B65D 33/20 383/116 |
| 6,767,628 B1 * | 7/2004 | Posa | ......................... | C09J 7/22 428/343 |
| 7,223,015 B2 * | 5/2007 | Steffens | ................. | B65D 27/30 383/5 |
| 7,703,980 B2 * | 4/2010 | Sampaio Camacho | ...................... | B65D 33/20 383/203 |
| 7,993,256 B2 * | 8/2011 | Takita | .................... | B65D 33/02 383/88 |
| 8,579,781 B2 * | 11/2013 | Sampaio Camacho | ...................... | B65D 33/1691 493/213 |
| 8,794,834 B2 * | 8/2014 | Forman | ............. | B65D 33/1691 383/2 |
| 8,912,119 B2 * | 12/2014 | Tynan, Jr. | .................. | C09J 7/00 503/215 |

* cited by examiner

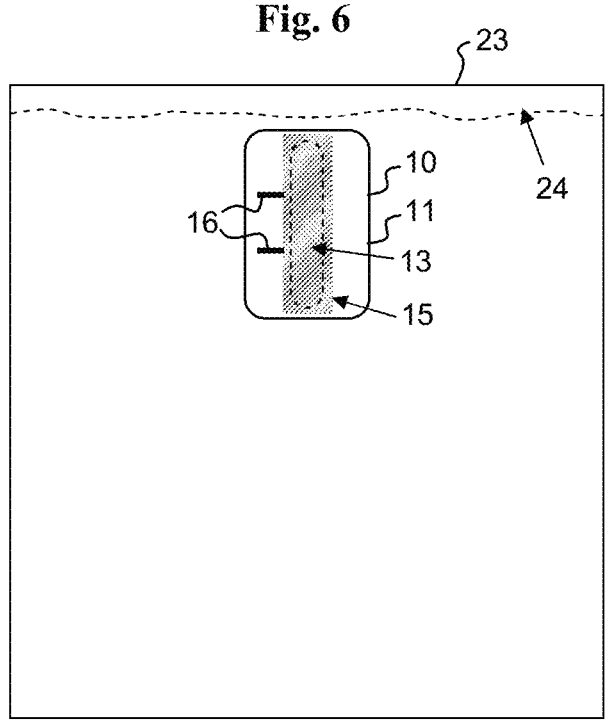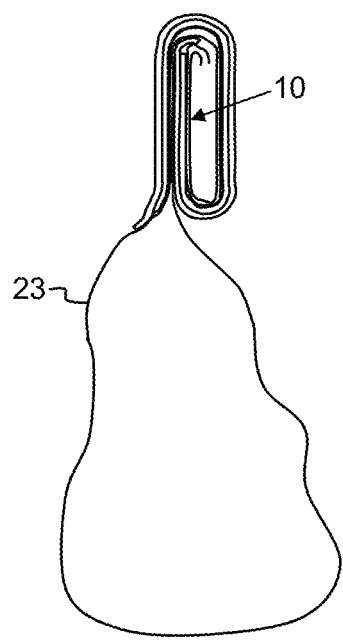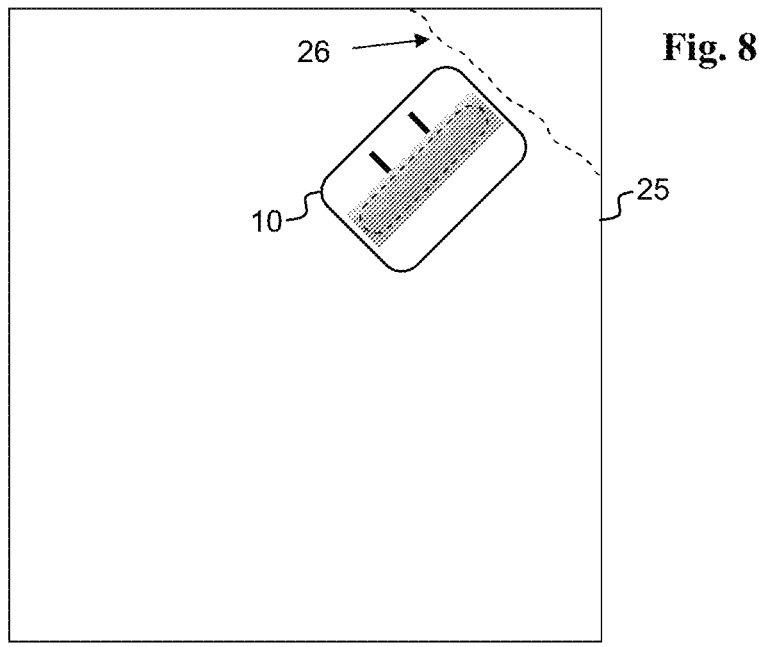

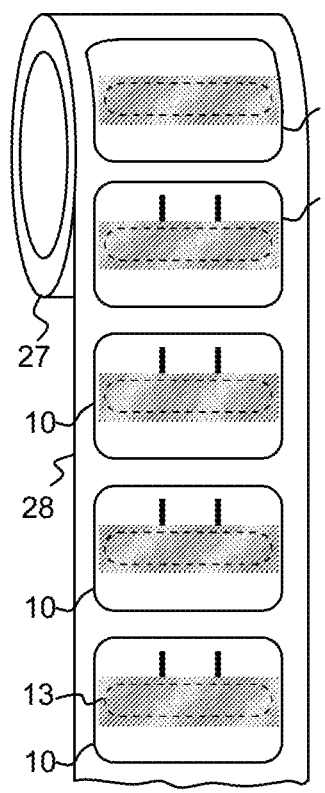
Fig. 9
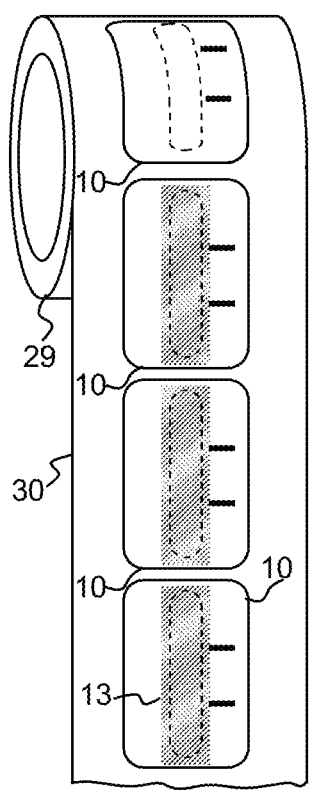
Fig. 10
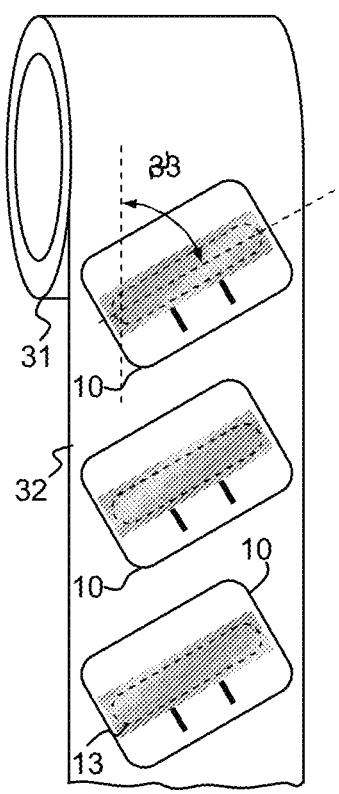
Fig. 11
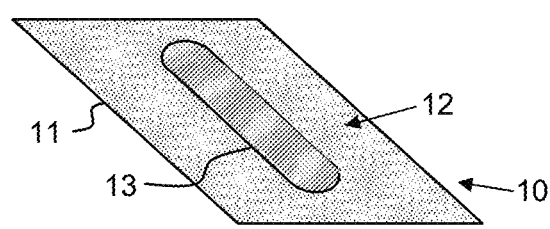
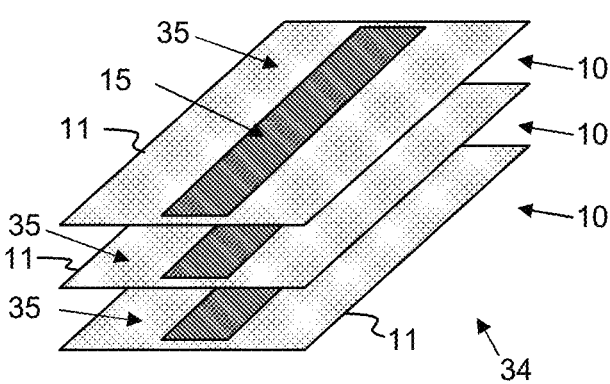
Fig. 12

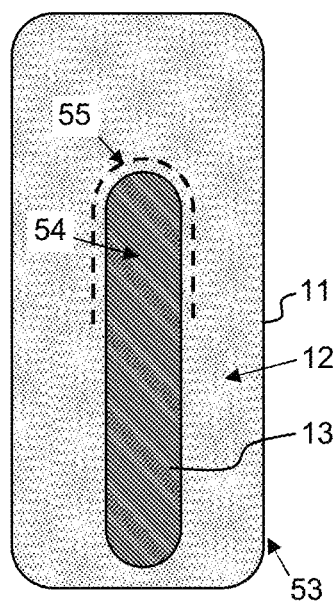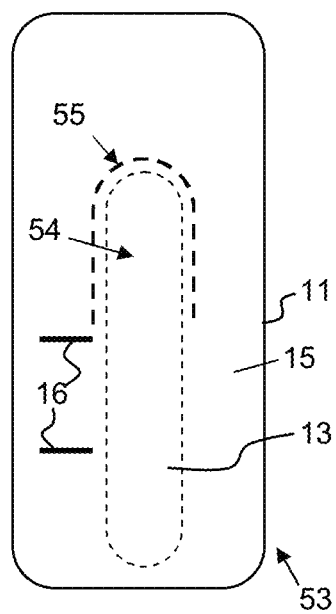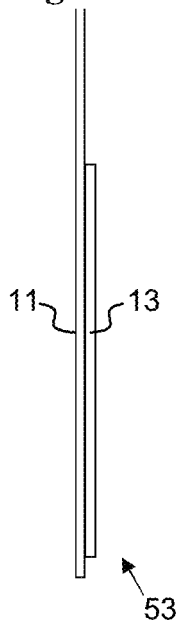
Fig. 22A  Fig. 22B  Fig. 22C
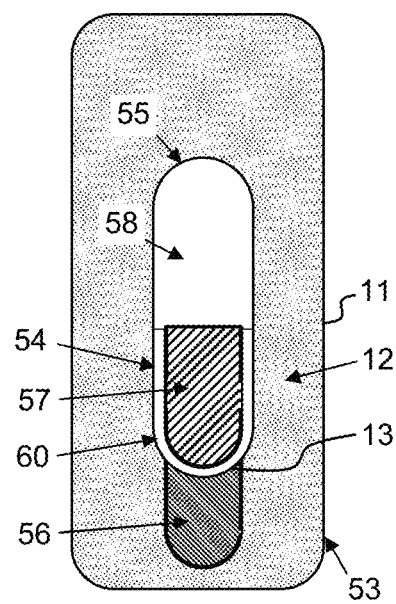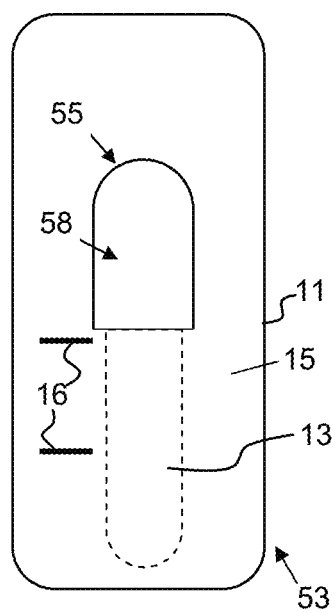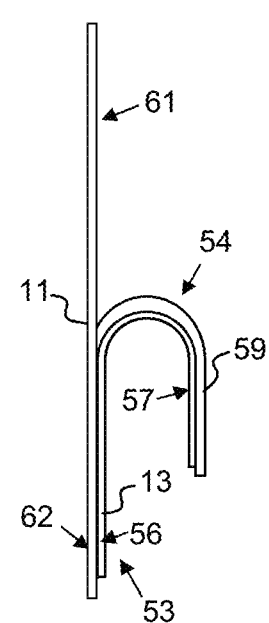
Fig. 23A  Fig. 23B  Fig. 23C

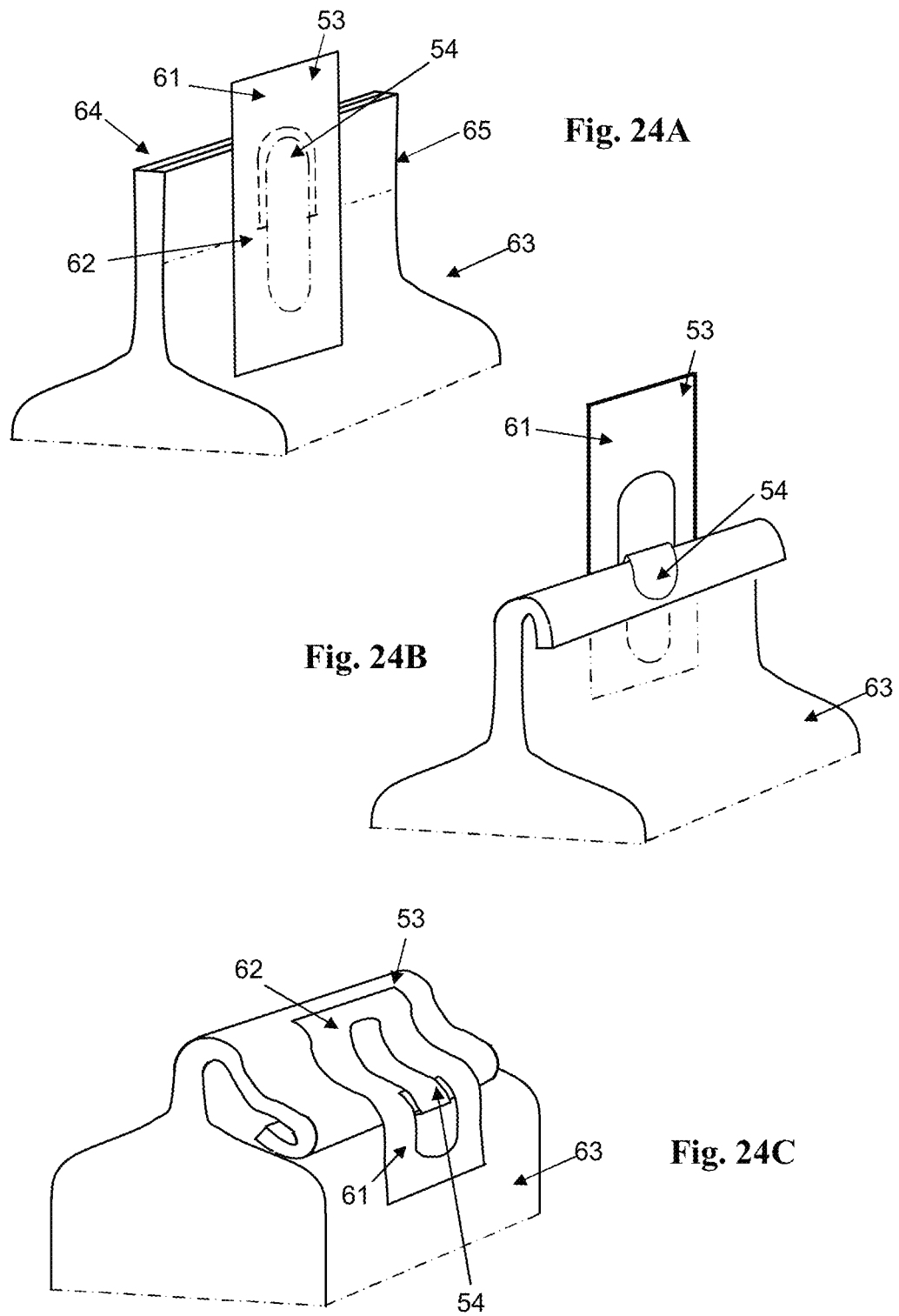

ADHESIVE CLAMP FOR CLOSING A BAG

CROSS-REFERENCE TO RELATED APPLICATIONS

This application is a continuation of U.S. patent application Ser. No. 13/382,158, filed Jan. 4, 2012, which is a U.S. National Phase Application under 35 U.S.C. 371 of PCT International Application No. PCT/IB2010/052625, which has an international filing date of Jun. 13, 2010, and which claims priority benefit of U.S. Provisional Patent Application Nos. 61/223,426, filed Jul. 7, 2009, and 61/324,318, filed Apr. 15, 2010, the contents of which are incorporated herein by reference in their entirety.

FIELD AND BACKGROUND

The present invention relates to packaging and, more particularly, but not exclusively to an adhesive clamp for closing and reopening package such as a bag.

Many types of food are sold in packages or bags made of paper or various types of plastic sheets. Such bags are usually filled and sealed in a way that requires the user to tear or cut open the edge of the bag to access the food. However, it is common that the food contained in the bag is not consumed in its entirety just after opening the bag, and that the user would want to reclose the bag to keep the rest of the food within. There are several such solutions enabling reclosing of an opened food packaging or bag.

Food is usually packed in a sealed or vacuum state so that it is not exposed to humidity and oxygen in the air.

A zipper pack is known in the art, where a zipper consisting of female and male zipper members is provided at an opening of the pack. A user may then use the zipper to conveniently seal the opening. U.S. Pat. Nos. 5,007,143, 5,059,036, 5,147,272, 6,820,391, and 7,524,110 are believed to represent the most relevant prior art in this field. However, the zipper may easily collapse under external pressure, there are difficulties in manufacturing zipper packs, including increase in manufacturing cost.

There are various types of fasteners for reclosing bags. Such fasteners are usually quite bulky and are bought independently of the package. U.S. Pat. Nos. 7,503,696, and 7,322,920 are believed to represent the most relevant prior art in this field. However, such solutions are usually not at hand when a bag should be closed. It is clearly advantageous to have a fastener or a clamp that is a part of the packaging or bag and is therefore always available. However, since this fastener or clamp is not intended to be reused with another packaging it should be relatively inexpensive.

Another type of reclosing solutions uses an adhesive flap near the opening of the bag. U.S. Pat. Nos. 5,089,320, 6,918,532 and U.S. Patent PG Publication No 2008/0260305 are believed to represent the most relevant prior art in this field.

Other solutions use an adhesive tack. After opening the bag, the user can fold the bag and use the tack to keep the edge folded. U.S. Pat. No. 4,902,141 is believed to represent the most relevant prior art in this field. This type of solution is also advantageous as it includes the folding of the bag, which reduces the amount of air in the bag, thus reducing humidity and oxygen in the bag. However, this solution is effective only for a small number of opening and reclosing cycles. The adhesive gets contaminated by powder from the bag content, oil, and fat from the hands of the users and thereafter stops functioning after one or two opening cycles. Another disadvantage is that the adhesive does not function in deep freeze conditions and the bag will not stay closed when in deep freeze conditions.

It is further desired to have reclosing techniques that are appropriate for flexible packs made of a polyethylene (PE) polypropylene (PP), multilayer or laminated films, which are relatively inexpensive and easily manufactured.

There is thus a widely recognized need for, and it would be highly advantageous to have, a package-reclosing device devoid of the above limitations.

SUMMARY

According to one aspect of the present invention there is provided an adhesive clamp for closing a packaging bag, the adhesive clamp including: a tape having one side of the tape coated with an adhesive material, and a clamping strip of foldable non-elastic material attached to the adhesive side of the tape, where the tape is wider and longer than the clamping strip.

According to another aspect of the present invention there is provided an adhesive clamp for closing a packaging bag where the clamping strip is foldable at least in two places along the clamping strip.

According to yet another aspect of the present invention there is provided an adhesive clamp for closing a packaging bag where the strip can be straightened.

According to still another aspect of the present invention there is provided an adhesive clamp for closing a packaging bag where at least one of the adhesive clamp and the clamping strip can be bent and straightened at least 20 times.

Further according to another aspect of the present invention there is provided an adhesive clamp for closing a packaging bag where the length of the clamping strip enables manual folding.

Yet further according to another aspect of the present invention there is provided an adhesive clamp for closing a packaging bag where the two places of folding are visibly marked on the tape.

Still further according to another aspect of the present invention there is provided an adhesive clamp for closing a packaging bag where the clamping strip width is adapted to eliminate puncture of at least one of the tape and/or the packaging bag.

Even further according to another aspect of the present invention there is provided an adhesive clamp for closing a packaging bag where the tape is wider and longer than the clamping strip to seal a puncture of the packaging bag by an edge of the clamping strip.

Additionally according to another aspect of the present invention there is provided an adhesive clamp for closing a packaging bag where the tape includes a flexible material.

Additionally according to yet another aspect of the present invention there is provided an adhesive clamp for closing a packaging bag where the clamping strip is rounded at the edges to reduce the probability of puncturing the bag.

Additionally according to still another aspect of the present invention there is provided an adhesive clamp for closing a packaging bag where at least one of the tape and the adhesive material is at least one of transparent and pressure sensitive.

Also, according to another aspect of the present invention there is provided an adhesive clamp for closing a packaging bag where the tape includes a non-transparent print hiding the clamping strip.

Further according to another aspect of the present invention there is provided an adhesive clamp for closing a packaging bag where the tape includes a flexible material withstanding a pressure of the clamping strip to avoid puncture of the tape.

Still further according to another aspect of the present invention there is provided an adhesive clamp for closing a packaging bag where at least one of the adhesive material and the clamping strip is approved for indirect contact with food.

Yet further according to another aspect of the present invention there is provided an adhesive clamp for closing a packaging bag where the clamping strip is a coated tin plate.

Even further according to another aspect of the present invention there is provided an adhesive clamp for closing a packaging bag where the clamping strip is mounted on the tape with the burr facing the tape.

Additionally according to another aspect of the present invention there is provided an adhesive clamp for closing a packaging bag where the tape includes a plastic material selected from a group consisting of: polypropylene, polyethylene or PET film.

According to yet another aspect of the present invention there is provided a roll including of film and a plurality of adhesive clamps mounted on the film, and where the adhesive clamp can be easily removed from the film, where each adhesive clamp includes: a tape having one side of the tape coated with an adhesive material, and a strip of foldable non-elastic material attached to the adhesive side of the tape, where the tape is wider and longer than the strip, where the plurality of adhesive clamps is placed on the film with the length of the clamping strips positioned least one of: perpendicular to the length of the film, along the length of the film, in a sharp angle with respect to the length of the film.

According to still another aspect of the present invention there is provided a stack of a plurality of adhesive clamps, where each adhesive clamp includes: a tape having one side of the tape coated with an adhesive material and the other side coated with a release material, and a strip of foldable non-elastic material attached to the adhesive side of the tape, where the tape is wider and longer than the strip, where the plurality of adhesive clamps are placed on each other with the layer of release material between.

Additionally according to another aspect of the present invention there is provided a stack of a plurality of adhesive clamps where the release material includes silicon.

Further according to another aspect of the present invention there is provided a packaging bag including: a bag including a flexible material and having a place of opening at one edge of the bag, and an adhesive clamp for closing a packaging bag, the adhesive clamp including: a tape having one side of the tape coated with an adhesive material, and a strip of foldable non-elastic material attached to the adhesive side of the tape, where the tape is wider and longer than the strip, where the adhesive clamp is attached to the bag close to the place of opening, and where the strip is attached to the bag between the tape and the bag and perpendicularly to the place of opening.

Still further according to another aspect of the present invention there is provided a packaging bag where the adhesive clamp is attached to the bag at the front side of the bag.

Yet further according to another aspect of the present invention there is provided a packaging bag where the adhesive clamp is attached to the bag at the back side of the bag.

Even further according to another aspect of the present invention there is provided a packaging bag where the adhesive clamp is attached to the bag at the corner of the bag.

Also, according to another aspect of the present invention there is provided a packaging bag where the bag is a pillow bag, and/or a gasseted bag, and/or a stand up pouch.

Additionally according to another aspect of the present invention there is provided a packaging bag where the bag includes at least one of paper, cloth or plastic sheet.

Additionally according to yet another aspect of the present invention there is provided a packaging bag where the bag is a food-packaging bag.

Further according to another aspect of the present invention there is provided a packaging bag a method for manufacturing an adhesive clamp for reclosing a packaging bag, the method including: providing a tape having one side of the tape coated with an adhesive material, and attaching a clamping strip to the tape at the coated side of the tape, where the clamping strip is made from a foldable non-elastic material and where the tape is wider and longer than the clamping strip.

Still further according to another aspect of the present invention there is provided an adhesive clamp additionally including an extension thus forming an extended adhesive clamp. Where the extension extends beyond the clamping strip, where the extension includes a tape coated with an adhesive material, and where the extension is operative to attach an opening of a bag to a surface of the bag.

Even further according to another aspect of the present invention there is provided an extended adhesive clamp additionally including a perforation between the extension and the clamping strip.

Additionally according to another aspect of the present invention there is provided an extended adhesive clamp additionally including a tear-strip between two perforations positioned between the extension and the clamping strip.

Also according to another aspect of the present invention there is provided an extended adhesive clamp where the extension includes a tape coated with a weaker adhesive material and a puling part that is not coated with any adhesive material.

Also according to yet another aspect of the present invention there is provided an adhesive clamp according where at least a part of the clamping strip is foldable independently of the tape.

Also according to still another aspect of the present invention there is provided an adhesive clamp additionally including an extension extending beyond the clamping strip, the extension including a tape coated with an adhesive material, the extension being operative to attach an opening of a bag to a surface of the bag.

Further according to another aspect of the present invention there is provided an adhesive clamp where the tape includes a part including a tape coated with an adhesive material, the part being operative to attach an opening of a bag to a surface of the bag and where the part is foldable independently of the clamping strip.

Yet further according to another aspect of the present invention there is provided an adhesive clamp where the tape includes at least one of a cut and a perforation around the part of the clamping strip that is foldable independently of the tape.

Still further according to another aspect of the present invention there is provided an adhesive clamp where the tape includes a perforation for enabling a user to cut the tape between the clamping strip and the bag.

Even further according to another aspect of the present invention there is provided an adhesive clamp where the tape includes an extension for enabling a user to tear open the part of the tape from the bag.

Additionally according to another aspect of the present invention there is provided an adhesive clamp where the tape includes a tear-strip for enabling a user to pull the tear-strip and tear the tape to open the bag.

Also, according to another aspect of the present invention there is provided an adhesive clamp where the clamping strip includes a plurality of rigid elements connected by elastic joints wherein the joints, after being bent, preserve the respective orientation of the elements.

Unless otherwise defined, all technical and scientific terms used herein have the same meaning as commonly understood by one of ordinary skill in the art to which this invention belongs. The materials, methods, and examples provided herein are illustrative only and not intended to be limiting. Except to the extend necessary or inherent in the processes themselves, no particular order to steps or stages of methods and processes described in this disclosure, including the figures, is intended or implied. In many cases the order of process steps may vary without changing the purpose or effect of the methods described.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 6 is a simplified illustration of a recloseable bag with an adhesive clamp mounted near a place of opening;

FIG. 7 is a simplified illustration of a side view of the recloseable bag with an adhesive clamp folded twice;

FIG. 8 is a simplified illustration of a recloseable bag having a place of opening near its corner and an adhesive clamp mounted diagonally near the place of opening;

FIG. 9 is a simplified illustration of a roll of adhesive clamps mounted across;

FIG. 10 is a simplified illustration of a roll of adhesive clamps mounted along;

FIG. 11 is a simplified illustration of a roll of adhesive clamps mounted diagonally;

FIG. 12 is a simplified illustration of a stack of adhesive clamps;

FIGS. 22A, 22B, and 22C are simplified illustrations of different views of a folding adhesive clamp with the folding part flat with the carrying tape;

FIGS. 23A, 23B, and 23C, are simplified illustrations of different views of a folding adhesive clamp with the folding part folded away from the carrying tape;

FIGS. 24A, 24B, and 24C are simplified illustrations of three views of a recloseable bag with a folding adhesive clamp;

DETAILED DESCRIPTION

Figure 1:
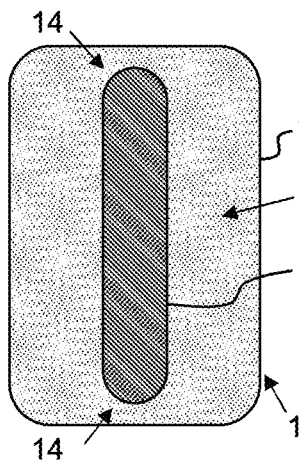
FIG. 1 is a simplified illustration of an adhesive clamp shown from the side of the adhesive coating and clamping strip.

The present embodiments comprise an adhesive clamp for reclosing an opened packaging or bag.

The present invention concerns flexible packaging, made from one layer film or from laminate, in particular the kind of packaging used for marketing food stuffs in bulky or granular form. Most flexible packaging is usually made up of a laminated plastic film constituted by two or more laminations, the plastics for the outside laminate being chosen with a view to preserve the contents of the bag, and to carry the printed text. The inside film is chosen to provide good sealability. The film for the bag is chosen to be more or less flexible depending on the product to be packaged. Typically, the bag is sealed at least along one longitudinal seam and at two-cross seams when produced from a sheet. Alternatively, and also typically, when the bag is without longitudinal seal if produced from a tube like material the bag is sealed at the two-cross seams only.

In order to open the sealed package, one of the seams generally is torn or cut. The reclosing of the bag and sealing it, in this condition to prevent damage to the contents, presents a great problem and many attempts have been made to find a suitable solution. An advantageous and common technique is to fold the bag at the opening, preferably twice or more, and secure the folding by a clamp or an adhesive tack. The principles and operation of an adhesive clamp according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale, different figs. May use different scales and different scales can be used even within the same drawing, for example for the adhesive clamp and the bag.

The purpose of the present invention is to provide a bag reclosing solution. The bag reclosing apparatus should enable a user to close a bag after it is opened. The main application of the apparatus is food bags, packs and similar packages. Preferably, such food bags are closed at the factory by sealing and thus, when opened, the user tears or cuts an opening. The bag reclosing solution enables the user to reclose the bag or package after it is opened. This apparatus should provide the following features and characteristics:

Be reasonably inexpensive.
Sustain 10-20 opening and reclosing cycles.
Function in a large spectrum of temperatures, including deep freeze.
Comply with regulations and standards applicable for food packaging.
Enable minimizing the volume of air in the bag as the volume of food in the bag decreases.
Adaptive to a large variety of bag sizes.
Adaptive to a large variety of bag materials.
Adaptive to bag manufacturing lines.

Reference is now made to FIG. 1, which is a simplified illustration of an adhesive clamp 10 according to a preferred embodiment of the present invention.

As seen in FIG. 1, the adhesive clamp 10 preferably includes:
a tape 11 having one side coated with an adhesive material 12; and
a clamping strip 13 of foldable plastic (non-elastic) material attached to the adhesive side of the tape 11;

FIG. 1 shows the adhesive clamp 10 from the side of the adhesive coating 12 and clamping strip 13.

As seen in FIG. 1, the tape 11 is preferably wider and longer than said clamping strip 13. Preferably, the tape 11 is made of a plastic material such as polypropylene, polyethylene and PET. Preferably, the adhesive material 12 and/or the clamping strip 13 is approved for indirect contact with food. Preferably, the clamping strip 13 is made of coated thin tin plate, typically of 0.3 mm thickness, or from another material like plastic, etc. Preferably, the clamping strip 13 is punched out of a coated tin plate and is mounted on the tape 11 with the burr facing the tape 11. Preferably, the clamping strip 13 is long enough to enable manual folding, preferably at least 3 centimeters long.

It is appreciated that the clamping strip 13 consist, or may be made of, other types of metals, or other materials, or combinations thereof, which after being folded or bent preserve the folded or bent shape or form (non-elastic materials).

As seen in FIG. 1, the width of the clamping strip 13 is wide enough to eliminate puncture of the tape 11 and/or the packaging bag to which the adhesive clamp is attached. Preferably, the width of the clamping strip 13 is adapted to the strength of the material from which the tape 11 and/or the bag are made. The clamping strip 13 is preferably rounded at the edges 14 to further eliminate puncture of the tape 11 and/or the packaging bag. Furthermore, the tape 11 is wider and longer than the clamping strip 13 to seal a puncture of the packaging bag by an edge of the clamping strip 13.

Preferably, the tape 11 comprises a flexible material and is also preferably transparent. Preferably, the adhesive material or adhesive substance or adhesive coating 12 is also transparent and preferably pressure sensitive.

Figure 2:
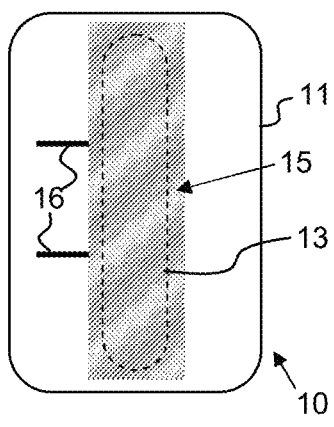
FIG. 2 is a simplified illustration of the adhesive clamp shown from the side opposite to the adhesive coating and the clamping strip.

Reference is now made to FIG. 2, which is a simplified illustration of the adhesive clamp 10 shown from the side opposite to the adhesive coating 12 and clamping strip 13.

As seen in FIG. 2, the adhesive clamp 10 preferably includes a printed area 15 over the tape 11 at the area of the clamping strip 13. Preferably, the printed area is non-transparent, and slightly larger than the clamping strip 13 to cover and hide the clamping strip 13 when viewed from this side of the adhesive clamp 10. Preferably, the print also includes two or more folding marks 16 recommending to the user places where the clamping strip 13 should be folded.

Figure 3:
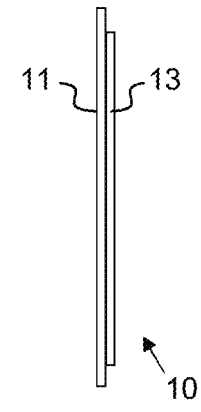
FIG. 3, is a simplified illustration of a side view of the adhesive clamp.

Reference is now made to FIG. 3, which is a simplified illustration of a side view of the adhesive clamp 10. In practice, the clamping strip 13 is thinner and embedded in (pressed into) the tape 11.

Figure 4:
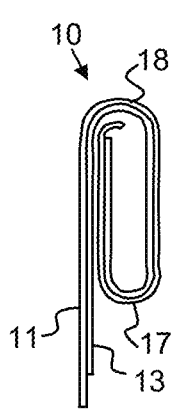
FIG. 4 is a simplified illustration of the adhesive clamp in a folded state.

Reference is now made to FIG. 4, which is a simplified illustration of the adhesive clamp 10 in a folded state.

As seen in FIG. 4, clamping strip 13 is preferably foldable at least twice, preferably in two places 17 and 18, preferably compatible with the folding marks 16.

Preferably, the clamping strip 13 is made from a material that enables the clamping strip 13 to be bent and straightened back at least 20 times. Preferably, the tape 11 is made of a flexible yet strong enough material to bend with the clamping strip 13 without tear or wear at least 20 times. Thus, the entire adhesive clamps can be bent and unbent at least 20 times while adhering to a bag to which it is attached.

Reference is now made to FIGS. 5A, 5B, 5C, and 5D, which are simplified illustrations of an articulated adhesive clamp 19 according to a preferred embodiment of the present invention.

The articulated adhesive clamp 19 is similar to the adhesive clamp 10 of FIGS. 1-4 except that it preferably consist of an articulated clamping strip 20 instead of the clamping strip 13.

Figure 5A:
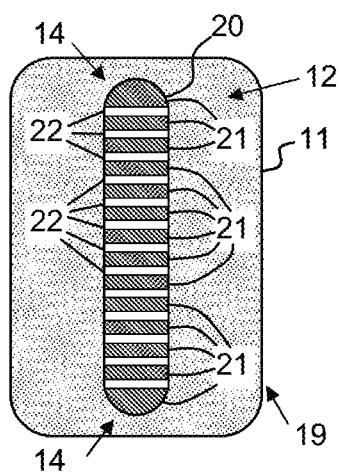
FIGS. 5A, 5B, 5C, and 5D are simplified illustrations of an articulated adhesive clamp including an articulated clamping strip including a plurality of rigid elements interconnected by elastic joints.

As seen in FIG. 5A, the articulated clamping strip 20 preferably consists of a series (or a chain) of rigid elements 21 connected by elastic joints 22. The rigid elements 21 can be bent about the joints 22. The joints 22 are preferably elastic in that the joints 22, after being bent, preserve the orientation of the elements 21. Thus, similarly to the clamping strip 13, the articulated clamping strip 20 can be folded, or bent or curved about the joints 22, to form a folded strip, and thereafter the joints 22 preserve the folded or bent shape or form of the folded articulated adhesive clamp 19. Preferably, the joints 22 employ internal friction to preserve the orientation of their respective adjacent rigid elements 21.

Figure 5B:
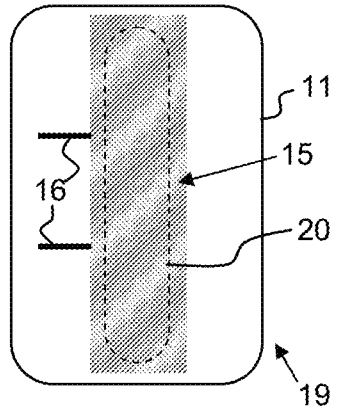
Figure 5C:
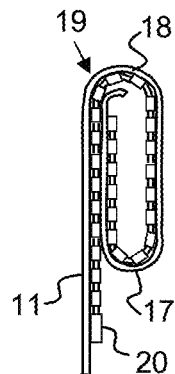
Figure 5D:
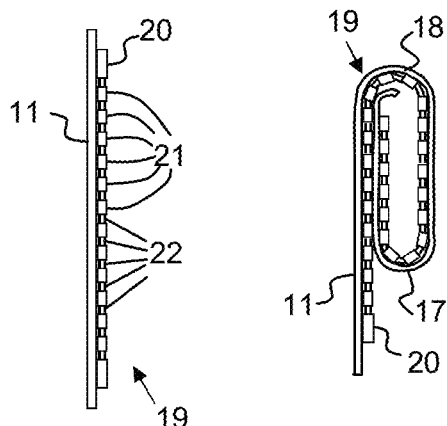

FIG. 5B shows the articulated adhesive clamp 19 from the tape 11 side opposite the adhesive side. FIG. 5C shows a side view of the articulated adhesive clamp 19. FIG. 5D shows the articulated adhesive clamp 19 folded.

Reference is now made to FIG. 6, which is a simplified illustration of a recloseable bag 23 with an adhesive clamp 10 mounted near a place of opening 24.

Reference is now made to FIG. 7, which is a simplified illustration of a side view of the recloseable bag 23 with an adhesive clamp 10 folded twice.

Reference is now made to FIG. 8, which is a simplified illustration of a recloseable bag 25 having a place of opening 26 near its corner and an adhesive clamp 10 mounted diagonally near the place of opening 26.

Preferably, the bags of FIGS. 6, and/or 7 and/or 8 are food-packaging bags. The bags of FIGS. 6, and/or 7 and/or 8 are typically made of paper, and/or cloth and/or plastic sheet. Preferably, the bags of FIGS. 6, and/or 7 and/or 8 are flat packaging bags. It is appreciated that the adhesive clamp 10 can be mounted on the front side of the bag but is preferably mounted on the back side of the bag.

It is appreciated that the bags of FIGS. 6, and/or 7 and/or 8 can be any of a pillow bag, and/or a gasseted bag, and/or a stand up pouch.

Reference is now made to FIG. 9, which is a simplified illustration of a roll 27 of adhesive clamps 10 mounted across.

The roll 27 includes a laminate band or film 28 on which a plurality of adhesive clamps 10 is placed with their adhesive side to the band 28. As seen in FIG. 9, the adhesive clamps 10 are positioned on the band 28 with the length of the clamping strips 13 perpendicular to the length of the band 28. Laying the width of the clamping strips 13 along the band 28, as seen in FIG. 9, does not bend the clamping strips 13 around the roll 27.

Reference is now made to FIG. 10, which is a simplified illustration of a roll 29 of adhesive clamps 10 mounted along.

The roll 29 includes a laminate band or film 30 on which a plurality of adhesive clamps 10 is placed with their adhesive side to the band 30. As seen in FIG. 9, the adhesive clamps 10 are positioned on the band 30 with the length of the clamping strips 13 along the length of the band 30. Laying the length of the clamping strips 13 along the band 30, as seen in FIG. 10, enables faster transfer to the packages but bends the clamping strips 13 around the roll 29 and thus requires the transfer machine to unbend the clamping strips 13.

Reference is now made to FIG. 11, which is a simplified illustration of a roll 31 of adhesive clamps 10 mounted diagonally.

The roll 31 includes a laminate band or film 32 on which a plurality of adhesive clamps 10 is placed with their adhesive side to the band 32. As seen in FIG. 9, the adhesive clamps 10 are positioned on the band 32 with the length of the clamping strips 13 at an angle 33 with the length of the band 32. The angle 33, preferably a sharp angle, preferably at 45 degrees, is compatible with the corner of the bag where the adhesive clamps 10 is to be attached, such as described with accordance to FIG. 8.

It is appreciated that the adhesive clamps 10 are mounted on the bands 28, 30 and/or 32 in a way that enables easy removal by a transferring machine in the bags manufacturing line for attaching the adhesive clamps 10 to the bags.

Reference is now made to FIG. 12, which is a simplified illustration of a stack 34 of adhesive clamps 10 according to a preferred embodiment of the present invention.

As seen in FIG. 12, the stack 34 includes a plurality of adhesive clamps 10 placed one over the other with a release material 35 between adhesive clamps 10. Preferably, the adhesive clamps 10 are identical or at least similar to the adhesive clamps 10 of FIGS. 1 to 4. Preferably, the release material comprises silicon. The stack 34 of FIG. 12 is particularly useful for distribution to consumers for use at home.

It has been shown that the present invention, as described with accordance to adhesive clamps 10 of FIGS. 1 to 4, the food bags 23 and 25 of FIGS. 6-8, the rolls 27, 29 and 31 of FIGS. 9-11 and the stack 34 of FIG. 12 provide the following features and characteristics:

Sustain at least 20 opening and reclosing cycles.
Function in a large spectrum of temperatures, including deep freeze.
Comply with regulations and standards applicable for food packaging.
Enable minimizing the volume of air in the bag as the volume of food in the bag decreases.
Adaptive to a large variety of bag sizes.
Adaptive to a large variety of bag materials.
Adaptive to bag manufacturing lines.
Useful at home.

Reference is now made to FIGS. 13A, 13B, 13C, and 13D, which are simplified illustrations of several views of an extended adhesive clamp 36 according to a preferred embodiment of the present invention.

Figure 13A:
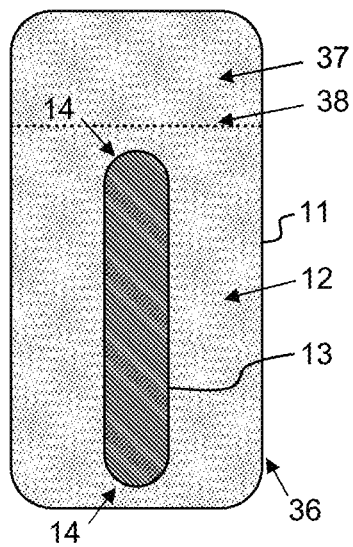
FIGS. 13A, 13B, 13C, and 13D are simplified illustrations of several views of an extended adhesive clamp.
Figure 13B:
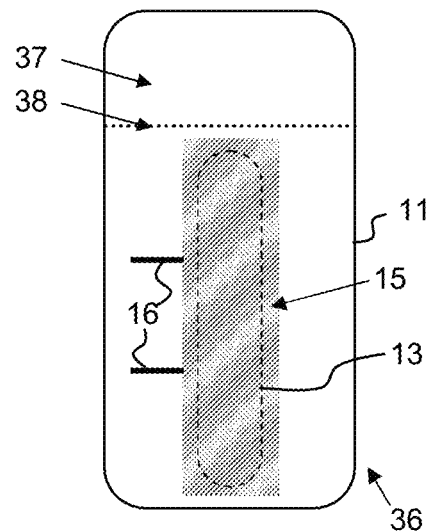
Figure 13C:
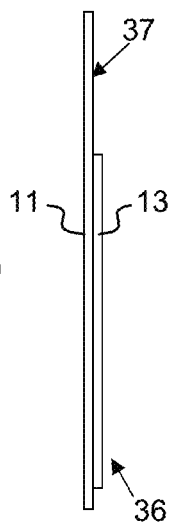
Figure 13D:
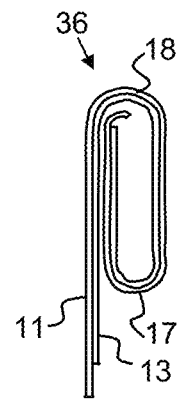

FIG. 13A is a simplified illustrations of adhesive clamp 36 viewed from the adhesive coating side. FIG. 13B is a simplified illustrations of extended adhesive clamp 36 viewed from the side opposite to the adhesive coating. FIG. 13C is a simplified illustrations of extended adhesive clamp 36 viewed from the narrow side. FIG. 13D is a simplified illustrations of extended adhesive clamp 36 viewed from the narrow side when folded.

As seen in FIGS. 13A, 13B, 13C, and 13D, the extended adhesive clamp 36 is similar to adhesive clamp 10 preferably with an extension part 37. The extension part 37 is preferably coated with adhesive material, preferably the same adhesive material as adhesive material (coating) 12. Perforation 38 is preferably provided to enable a user to easily tear the extension part 37 of the extended adhesive clamp 36 from the rest of the extended adhesive clamp 36.

Figure 14:
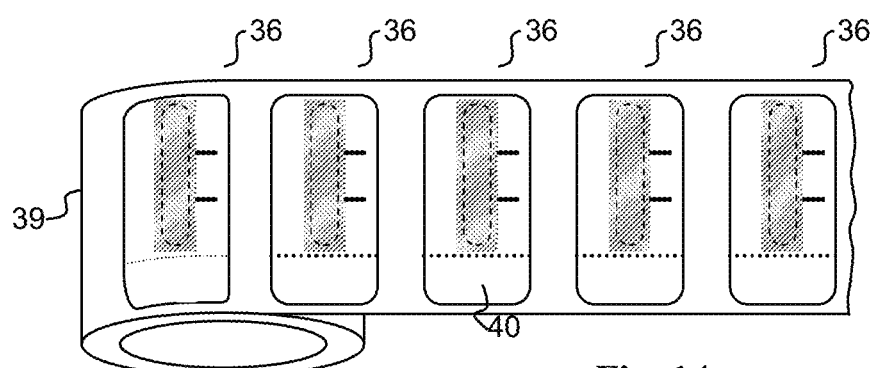
FIG. 14 is a simplified illustration of a roll of extended adhesive clamps.

Reference is now made to FIG. 14, which is a simplified illustration of a roll 39 of extended adhesive clamps 36 according to a preferred embodiment of the present invention.

As seen in FIG. 14, the roll 39 is made of a strip (or film) 40 and the extended adhesive clamps 36 are mounted on the strip 40 perpendicular to the length of the strip. If is appreciated that extended adhesive clamps 36 can be mounted on the strip along the length of the strip as shown in FIG. 10, or diagonally as shown in FIG. 11. If is appreciated that alternatively extended adhesive clamps 36 can be mounted on a Z-fold film or stacked as shown in FIG. 12.

Figure 15A:
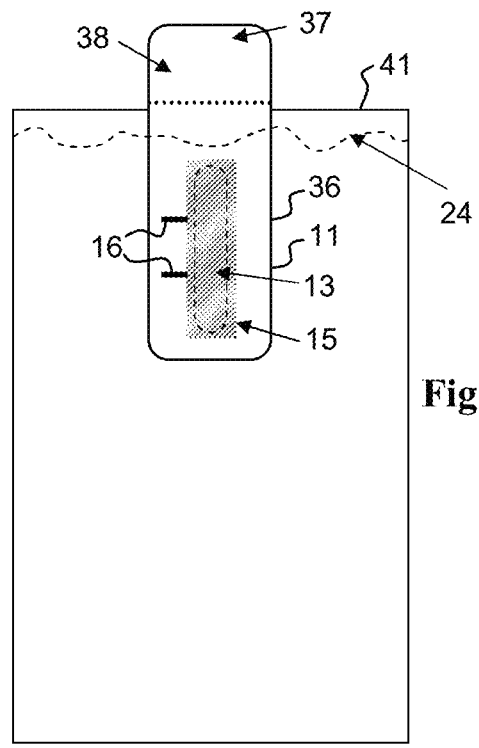
FIG. 15A is a simplified illustration of the extended adhesive clamp mounted on a bag before it is closed.

Reference is now made to FIG. 15A, which is a simplified illustration of the extended adhesive clamp 36 mounted on a bag 41 according to a preferred embodiment of the present invention.

Figure 15B:
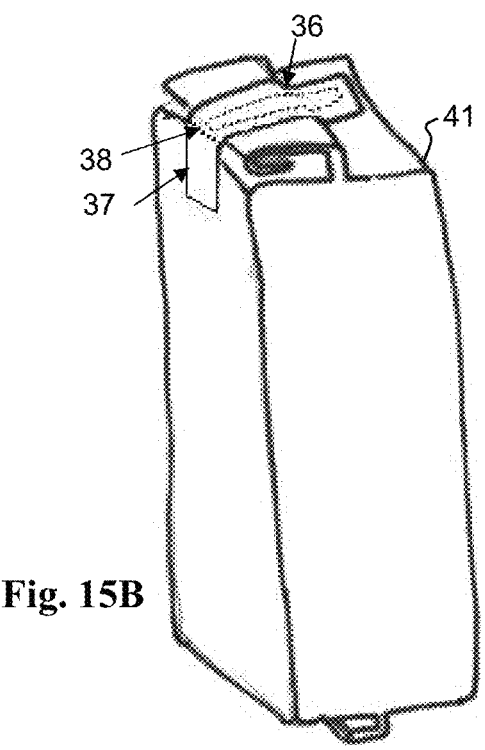
FIG. 15B is a simplified illustration of the extended adhesive clamp mounted on the closed bag.

FIG. 15B shows the bag 41 after it is filled and closed. As seen in FIG. 15B, the extended part 37 is affixed to the bag to attach the opening of the bag to the bag, preferably to maintain a preferred shape of the bag.

To open the bag 41 a user preferably tears the extended adhesive clamp 36 at the perforation 38. To close the bag 41 after it is opened the user folds the opening of the bag 41, which is then kept, folded with the aid of the clamping strip 13. FIG. 13D shows the extended adhesive clamp 36 without the extension part 37 (which is torn) and folded at the clamping strip 13 to close the bag 41 after it is opened.

Reference is now made to FIGS. 16A, 16B, 16C, and 16D, which are simplified illustrations of several views of an extended adhesive clamp 42 according to a preferred embodiment of the present invention.

Figure 16A:
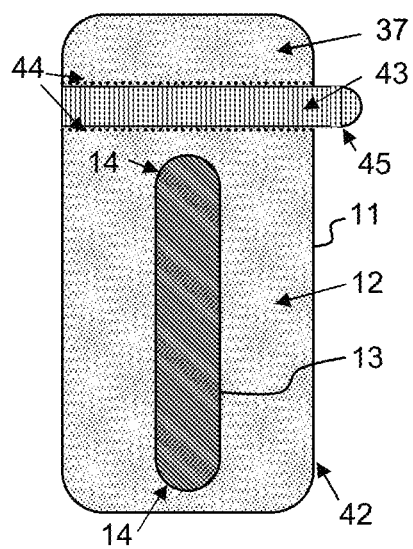
FIGS. 16A, 16B, 16C, and 16D are simplified illustrations of several views of an extended adhesive clamp.
Figure 16B:
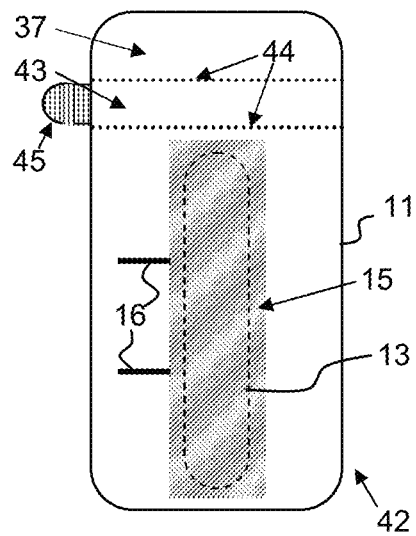
Figure 16C:
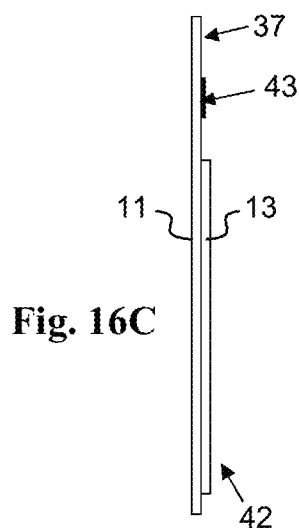
Figure 16D:
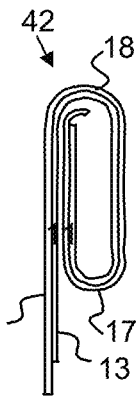

FIG. 16A is a simplified illustrations of adhesive clamp 42 viewed from the adhesive coating side. FIG. 16B is a simplified illustrations of extended adhesive clamp 42 viewed from the side opposite to the adhesive coating. FIG. 16C is a simplified illustrations of extended adhesive clamp 42 viewed from the narrow side. FIG. 16D is a simplified illustrations of extended adhesive clamp 42 viewed from the narrow side when folded.

As seen in FIGS. 16A, 16B, 16C, and 16D, the extended adhesive clamp 42 is similar to extended adhesive clamp 36, preferably with a tear-strip 43 provided between two perforations 44 (instead of perforation 38 of extended adhesive clamp 36). The extension part 37 is preferably coated with adhesive material, preferably the same adhesive material as adhesive material (coating) 12. The tear-strip 43 is preferably not coated with any adhesive on its outer side. Perforations 44 are preferably provided to enable a user to easily tear the extension part 37 of the extended adhesive clamp 42 from the rest of the extended adhesive clamp 42 by pulling at tip 45.

Figure 17:
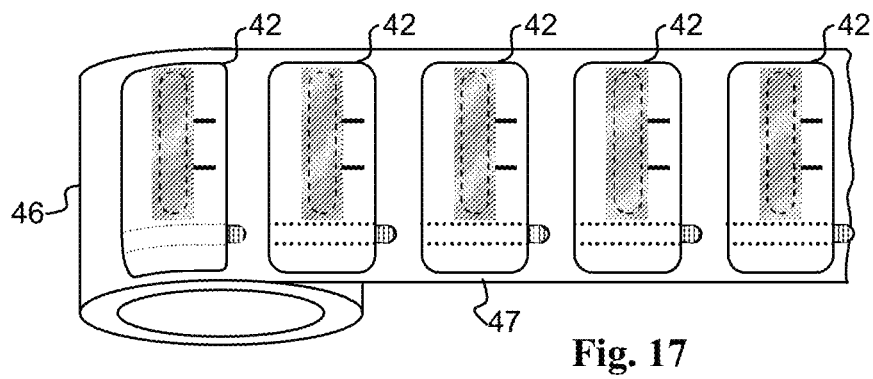
FIG. 17 is a simplified illustration of a roll of extended adhesive clamps.

Reference is now made to FIG. 17, which is a simplified illustration of a roll 46 of extended adhesive clamps 42 according to a preferred embodiment of the present invention.

As seen in FIG. 17, the roll 46 is made of a strip (or film) 47 and the extended adhesive clamps 42 are mounted on the strip 47 perpendicular to the length of the strip. If is appreciated that extended adhesive clamps 42 can be mounted on the strip along the length of the strip as shown in FIG. 10, or diagonally as shown in FIG. 11. If is appreciated that alternatively extended adhesive clamps 42 can be mounted on a Z-fold film or stacked as shown in FIG. 12.

Figure 18A:
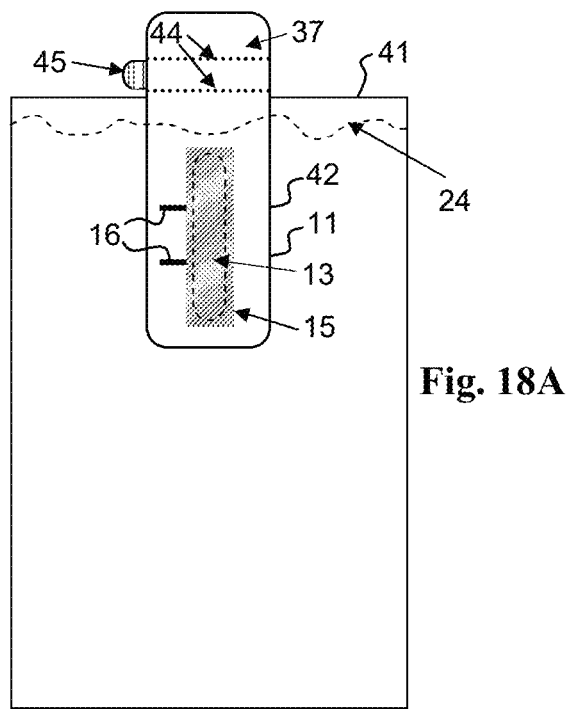
FIG. 18A is a simplified illustration of the extended adhesive clamp mounted on a bag before it is closed.

Reference is now made to FIG. 18A, which is a simplified illustration of the extended adhesive clamp 42 mounted on the bag 41 according to a preferred embodiment of the present invention. FIG. 18A shows the bag 41 before it is closed.

Figure 18B:
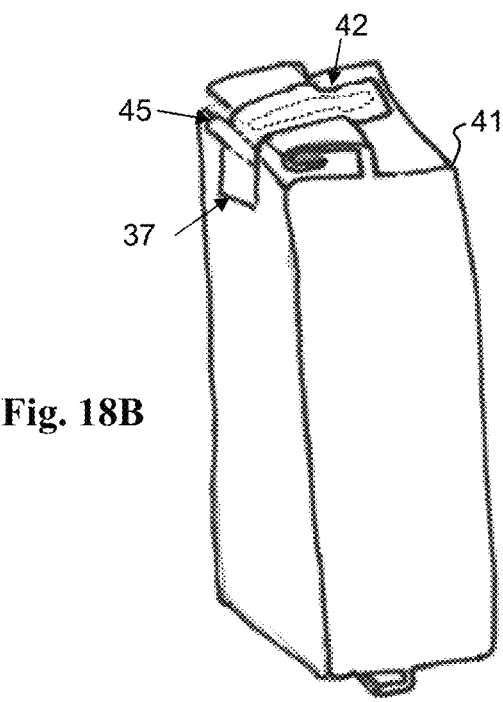
FIG. 18B is a simplified illustration of the extended adhesive clamp mounted on the closed bag.

Reference is now made to FIG. 18B, which is a simplified illustration of the extended adhesive clamp 42 mounted on the closed bag 41 according to a preferred embodiment of the present invention.

FIG. 18B shows the bag 41 after it is filled and closed. As seen in FIG. 18B, the extended part 37 is affixed to the bag to attach the opening of the bag to the bag, preferably to maintain a preferred shape of the bag.

To open the bag 41 a user preferably pulls at the tip 45, thus pulling tear-strip 43 and tearing the extended adhesive clamp 42 at the perforations 44. To close the bag 41 after it is opened the user folds the opening of the bag 41, which is then kept folded with the aid of the clamping strip 13. FIG. 16D shows the extended adhesive clamp 42 without the extension part 37 (which is torn) and folded at the clamping strip 13 to close the bag 41 after it is opened.

Reference is now made to FIGS. 19A, 19B, 19C, and 19D, which are simplified illustrations of several views of an extended adhesive clamp 48 according to a preferred embodiment of the present invention.

Figure 19A:
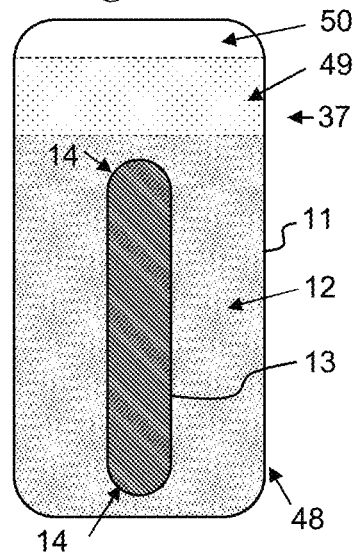
FIGS. 19A, 19B, 19C, and 19D are simplified illustrations of several views of an extended adhesive clamp.
Figure 19B:
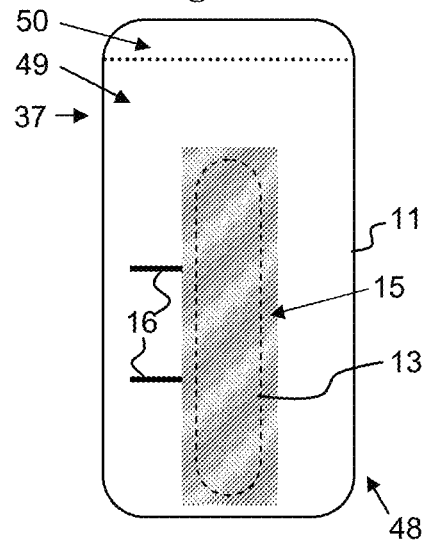
Figure 19C:
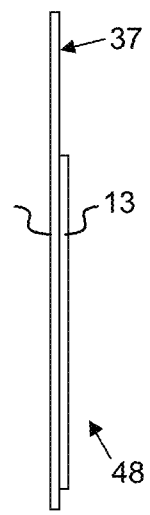
Figure 19D:
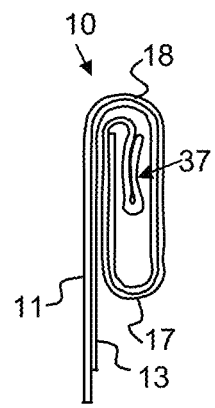

FIG. 19A is a simplified illustrations of adhesive clamp 48 viewed from the adhesive coating side. FIG. 19B is a simplified illustrations of extended adhesive clamp 48 viewed from the side opposite to the adhesive coating. FIG. 19C is a simplified illustrations of extended adhesive clamp 48 viewed from the narrow side. FIG. 19D is a simplified illustrations of extended adhesive clamp 48 viewed from the narrow side when folded.

As seen in FIGS. 19A, 19B, 19C, and 19D, the extended adhesive clamp 48 is similar to extended adhesive clamp 36 having extension part 37, however without perforation 38 of extended adhesive clamp 36. Instead, the extension part 37 of extended adhesive clamp 48 preferably divides into an adhesive part 49 and a pulling-part 50. The adhesive part 49 is preferably coated with an adhesive material, preferably weaker than the adhesive material (coating) 12. The pulling-part 50 is preferably not coated.

Figure 20:
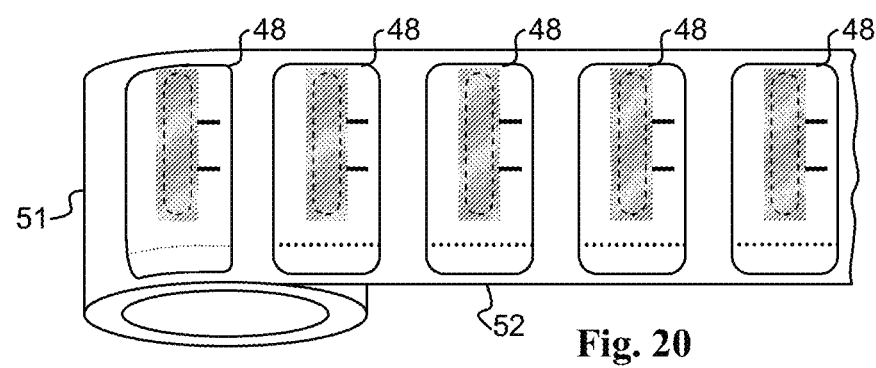
FIG. 20 is a simplified illustration of a roll of extended adhesive clamps.

Reference is now made to FIG. 20, which is a simplified illustration of a roll 51 of extended adhesive clamps 48 according to a preferred embodiment of the present invention.

As seen in FIG. 20, the roll 51 is made of a strip (or film) 52 and the extended adhesive clamps 48 are mounted on the strip 52 perpendicular to the length of the strip. If is appreciated that extended adhesive clamps 48 can be mounted on the strip along the length of the strip as shown in FIG. 10, or diagonally as shown in FIG. 11. If is appreciated that alternatively extended adhesive clamps 48 can be mounted on a Z-fold film or stacked as shown in FIG. 12.

Figure 21A:
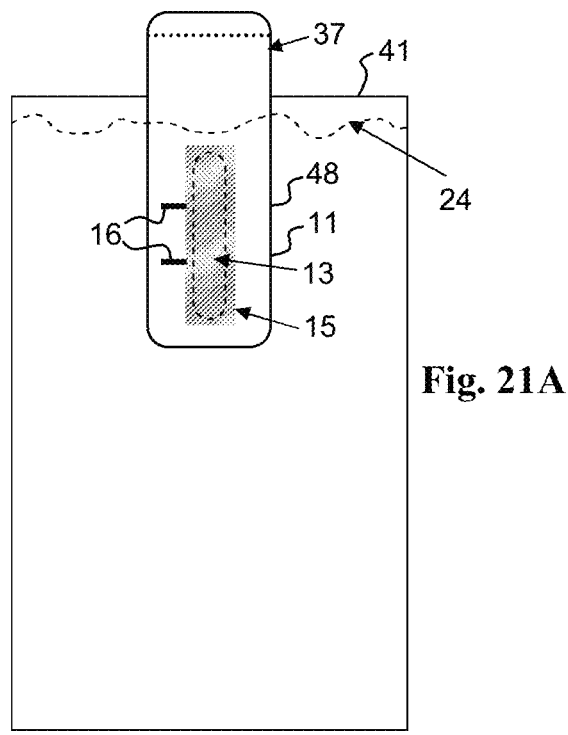
FIG. 21A is a simplified illustration of the extended adhesive clamp mounted on a bag before it is closed.

Reference is now made to FIG. 21A, which is a simplified illustration of the extended adhesive clamp 48 mounted on the bag 41 according to a preferred embodiment of the present invention. FIG. 21A shows the bag 41 before it is closed.

Figure 21B:
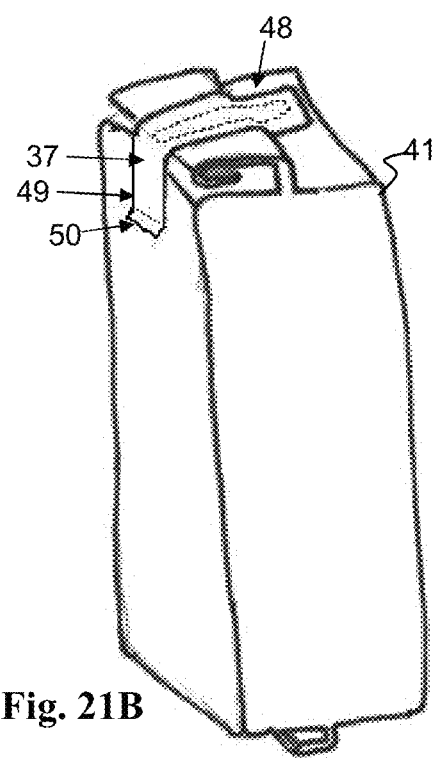
FIG. 21B is a simplified illustration of the extended adhesive clamp mounted on the closed bag.

Reference is now made to FIG. 21B, which is a simplified illustration of the extended adhesive clamp 48 mounted on the closed bag 41 according to a preferred embodiment of the present invention.

FIG. 21B shows the bag 41 after it is filled and closed. As seen in FIG. 21B, the extended part 37 is affixed to the bag to attach the opening of the bag to the bag, preferably to maintain a preferred shape of the bag.

To open the bag 41 a user preferably pulls at the pulling-part 50, thus detaching the adhesive part 49 from the bag 41. To close the bag 41 after it is opened the user preferably folds the adhesive part 49 over, and then folds the opening of the bag 41, which is then kept folded with the aid of the clamping strip 13.

FIG. 19D shows the extended adhesive clamp 48 with the extension part 37 folded over, and then the adhesive clamp 48 is folded at the clamping strip 13 to close the bag 41 after it is opened.

Reference is now made to FIGS. 22A, 22B, and 22C, and to FIGS. 23A, 23B, and 23C, which are simplified illustrations of different views of a folding adhesive clamp 53 according to a preferred embodiment of the present invention.

The folding adhesive clamp 53 is preferably similar to the adhesive clamp 10 but has a folding part 54 that is foldable independently of the tape 11. FIGS. 22A, 22B, and 22C show the folding adhesive clamp 53 with the folding part 54 flat with the tape 11, while FIGS. 23A, 23B, and 23C show the folding part 54 folded away from and independently of the rest of the tape 11.

As seen in FIGS. 22A to 23C, the folding part 54 preferably comprises at least a part of the clamping strip 13. Preferably, the folding adhesive clamp 53 has a cut or a perforation 55 around the folding part 54 to enable a user or a machine to disconnect the folding part 54 from the rest of the tape 11 before it is folded away from and independently of the rest of the tape 11.

FIG. 22A shows the folding adhesive clamp 53 with the clamping strip 13 attached to the tape 11 on the side of the adhesive material and/or coating 12. As seen in FIG. 22A, the folding part 54 includes a part of the clamping strip 13. FIG. 22B shows folding adhesive clamp 53 from the printed tape side 15 opposite to the adhesive material and/or coating 12. FIG. 22C is a side view of the folding adhesive clamp 53.

FIG. 23A shows the folding adhesive clamp 53 from the side of the adhesive material and/or coating 12, with the folding part 54, including a part of the clamping strip 13, folded away from the tape 11. As shown in FIG. 23A, a part 56 of the clamping strip 13 remains with the tape 11 while the other part 57 folds away leaving empty a window 58.

FIG. 22B shows folding adhesive clamp 53 from the printed tape side 15 opposite to the adhesive material and/or coating 12 with the folding part 54 in the folded position. FIG. 22C is a side view of the folding adhesive clamp 53 with the folding part 54 in the folded position.

As shown in FIG. 22C, the folding part 54 preferably includes the part 57 of the clamping strip 13 preferably attached to a part 59 of the tape 11. Preferably, the part 59 of the tape 11 includes margins 60 (shown in FIG. 22A) around the part 57 of the clamping-strip 13 to enable attaching the folding part 54 to another material or article, preferably a bag. Preferably, a remaining part 61 of the tape 11 is attachable to another part of the material and/or bag. Thus, when folded, the folding adhesive clamp 53 preferably includes three parts 62, 61 and 54 that can be attached to three parts of a recloseable bag or a similar article.

Reference is now made to FIGS. 24A, 24B, and 24C, which are simplified illustrations of three views of a recloseable bag 63 with a folding adhesive clamp 53 according to a preferred embodiment of the present invention.

FIG. 24A shows the recloseable bag 63 with the folding adhesive clamp 53 attached at the opening 64 of the recloseable bag 63. As shown in FIG. 24A the folding adhesive clamp 53 is preferably mounted on the recloseable bag 63 with one part 62 attached on one side of an imaginary folding line 65, a second part 54 (the foldable part) attached on another side of a folding line 65, and a third part 61 extending beyond the opening 64 of the recloseable bag 63.

Preferably, the third part 61 forms an extension extending beyond the clamping strip. The extension preferably includes a tape coated with an adhesive material. The extension enabling a user or a machine to attach one part of an article to another part of the article, preferably the opening of the bag to a surface of the bag.

It is appreciated that the folding adhesive clamp 53 includes one part including a tape coated with an adhesive material and operative to attach the opening of the bag to a surface of the bag while the foldable part 54 is foldable independently of the rest of the folding adhesive clamp 53.

FIG. 24B shows the recloseable bag 63 from the other side. The opening 64 is folded about the folding line 65. The foldable part 54 the folding adhesive clamp 53 is preferably folded with the opening 64 and away from the third part 61. The third part 61 extends beyond the opening 64 of the recloseable bag 63.

FIG. 24C shows the recloseable bag 63 with the opening 64 folded and held by the foldable part 54 and the third part 61 attached to a third part of the recloseable bag 63.

Figure 25:
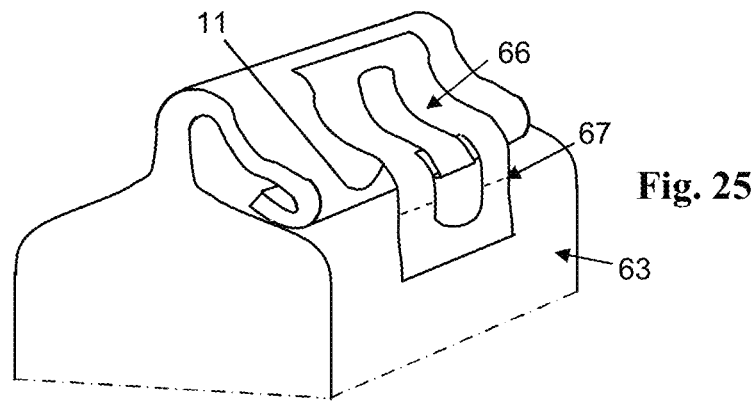
FIG. 25 is a simplified illustration of the recloseable bag closed with a perforated folding adhesive clamp.

Reference is now made to FIG. 25, which is a simplified illustration of the recloseable bag 63 closed with a perforated folding adhesive clamp 66 according to a preferred embodiment of the present invention.

As shown in FIG. 25, the perforated folding adhesive clamp 66 is similar to the folding adhesive clamp 53 except that it includes a perforation 67 enabling a user to cut the tape 11 of the perforated folding adhesive clamp 66 between the parts including the clamping strip 13 and the part attached to the bag 63.

Figure 26:
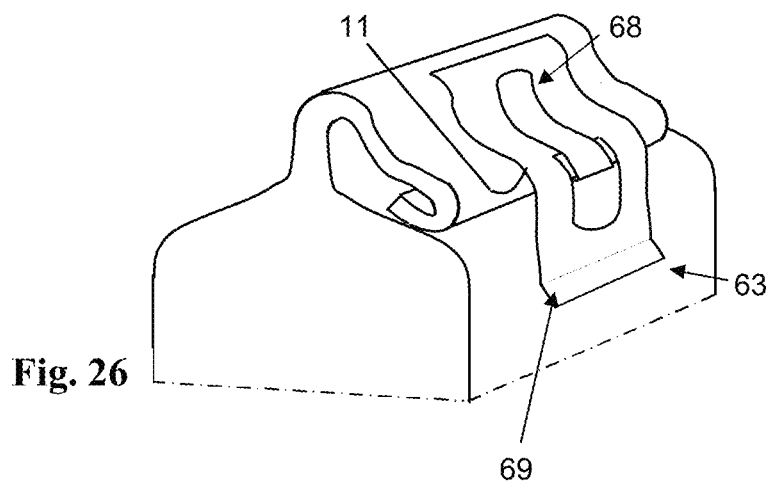
FIG. 26 is a simplified illustration of the recloseable bag closed with a detachable folding adhesive clamp.

Reference is now made to FIG. 26, which is a simplified illustration of the recloseable bag 63 closed with a detachable folding adhesive clamp 68 according to a preferred embodiment of the present invention.

As shown in FIG. 26, the detachable folding adhesive clamp 68 is similar to the folding adhesive clamp 53 except that it includes an extension 69 enabling a user to pull or tear open the tape 11 of the detachable folding adhesive clamp 68 from the bag 63.

Figure 27:
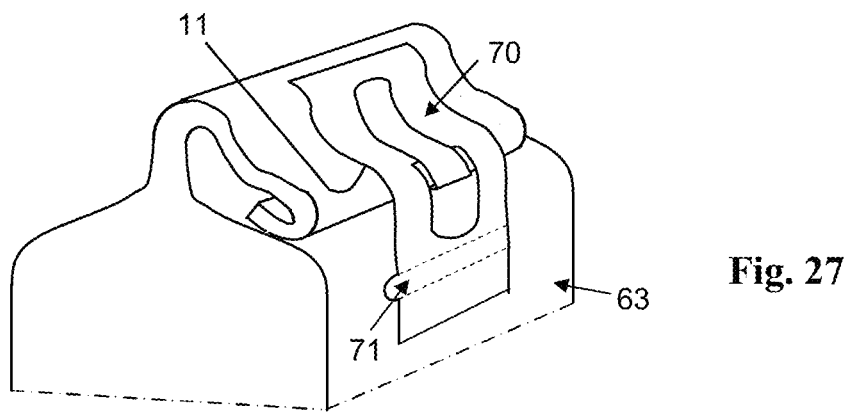
FIG. 27, which is a simplified illustration of the recloseable bag closed with a tear-strip folding adhesive clamp.

Reference is now made to FIG. 27, which is a simplified illustration of the recloseable bag 63 closed with a tear-strip folding adhesive clamp 70 according to a preferred embodiment of the present invention.

As shown in FIG. 27, the tear-strip folding adhesive clamp 70 is similar to the folding adhesive clamp 53 except that it includes a tear-strip 71 enabling a user to pull and tear the tape 11 of the detachable folding adhesive clamp 70 so as to open the bag 63. Preferably, the tear-strip folding adhesive clamp 70 includes perforations along the sides of the tear-strip to enable the user to easily tear the strip.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:
1. A method comprising:
   obtaining an adhesive clamp mounted on a film, wherein each adhesive clamp comprises:
      a single tape having one side of said tape coated with a single layer of adhesive material, and
      a single strip of flat, foldable, non-elastic, material attached to said single layer of adhesive material;

removing said adhesive clamp from said film by detaching said single layer of adhesive material, attached to said single strip of flat, foldable, non-elastic material, from said film; and attaching said adhesive clamp to a bag by attaching said single layer of adhesive material, attached to said single strip of flat, foldable, non-elastic material, to said bag, wherein said single, adhesive layer is attachable to said foldable non-elastic material and to said tape and to said film and to said bag.

2. A method according to claim 1, additionally comprising:

obtaining said film as at least one of a roll and a stack of films.

3. A method according to claim 1, additionally comprising:

obtaining said tape wider and longer than said strip of flat, foldable, non-elastic, material so that no part of said clamping strip is exposed.

4. A method according to claim 1, additionally comprising:

obtaining a transparent tape and a transparent adhesive material.

5. A method according to claim 1, wherein said tape is transparent except for a part comprising a nontransparent print hiding said clamping strip.

6. A method according to claim 1, additionally comprising:

obtaining said tape comprising a flexible material withstanding a pressure of said clamping strip to avoid puncture of said tape by and edge of said clamping strip.

7. A method according to claim 1, additionally comprising:

obtaining said clamping strip is approved for indirect contact with food.

8. A method according to claim 1, additionally comprising:

tin-coating said clamping strip.

9. A method according to claim 1, additionally comprising:

mounting said clamping strip on said tape with a burr facing said tape.

10. A method according to claim 1, additionally comprising:

obtaining said tape comprising a plastic material selected from a group consisting of: polypropylene, polyethylene and PET.

11. A method according to claim 1, additionally comprising:

mounting said adhesive clamp on said film with the length of said clamping strip positioned at least one of:

perpendicular to the length of said film;

along the length of said film; and in a sharp angle with respect to the length of said film.

* * * * *